United States Patent
Chen et al.

(10) Patent No.: US 6,899,278 B2
(45) Date of Patent: May 31, 2005

(54) MULTI-FUNCTIONAL ELECTRONIC CARD WITH MULTI-I/O INTERFACE

(75) Inventors: Caph Chen, Kaohsiung (TW); Jui-Chung Chen, Kaohsiung (TW); Ping-Chang Liu, Chu Pei (TW)

(73) Assignees: C-One Technology Corp., Hsin-Chu (TW); Pretec Electronics Corp., Fremont, CA (US)

( * ) Notice: Subject to any disclaimer, the term of this patent is extended or adjusted under 35 U.S.C. 154(b) by 0 days.

(21) Appl. No.: 10/295,992

(22) Filed: Nov. 18, 2002

(65) Prior Publication Data

US 2003/0226898 A1 Dec. 11, 2003

(30) Foreign Application Priority Data

Jun. 5, 2002 (TW) ........................................ 91208341 U

(51) Int. Cl.[7] ............................................. G06K 19/06
(52) U.S. Cl. ..................... 235/492; 235/380; 235/382; 235/441
(58) Field of Search .............................. 235/492, 375, 235/380, 382, 441; 710/301; 439/60, 638, 639

(56) References Cited

U.S. PATENT DOCUMENTS

| | | | | |
|---|---|---|---|---|
| 6,343,079 B1 | * | 1/2002 | Way et al. ................. | 370/401 |
| 6,386,920 B1 | * | 5/2002 | Sun ........................... | 439/630 |
| 6,397,300 B1 | * | 5/2002 | Arimilli et al. ............ | 711/138 |
| 6,461,170 B1 | * | 10/2002 | Oliphant et al. .......... | 439/76.1 |
| 6,463,095 B1 | * | 10/2002 | Kataoka et al. ............ | 375/223 |
| 6,524,137 B1 | * | 2/2003 | Liu et al. .................... | 439/638 |
| 6,526,515 B1 | * | 2/2003 | Charles et al. ............. | 713/300 |
| 6,549,966 B1 | * | 4/2003 | Dickens et al. ............ | 710/300 |
| 6,658,516 B2 | * | 12/2003 | Yao ............................ | 710/301 |
| 6,776,653 B1 | * | 8/2004 | Hsiao ........................ | 439/541.5 |
| 6,783,399 B2 | * | 8/2004 | Joung ........................ | 439/630 |

* cited by examiner

*Primary Examiner*—Ahshik Kim
(74) *Attorney, Agent, or Firm*—Bacon & Thomas, PLLC

(57) ABSTRACT

A multi-functional electronic card with a multi-I/O interface has a plurality of interface ports for connecting to a host, at least one functional device, and a multi-interface and multi-functional controller. When an interface prot is inserted into the host, other interface ports are off-line automatically. The multi-interface and multi-functional controller is connected to a multi-I/O interface and the functional devices for selecting one functional device. Signals of the multi-I/O interface are converted into signals of the selected functional device so that the host can access the selected functional device.

5 Claims, 7 Drawing Sheets

MULTI-FUNCTIONAL ELECTRONIC CARD WITH MULTI-I/O INTERFACE

BACKGROUND OF THE INVENTION

1. Field of the Invention

The present invention relates to an electronic card, and more particularly to a multi-functional electronic card with multi-I/O interface.

2. Description of Related Art

With the improvement of electronic technology, electronic devices are made more and more compact. For example, small volume computers, such as notebook computers, palm computers, or personal digital assistants, etc., are portable and have strong processing ability. Thereby, the user can get a great convenience from these devices. However, since the volume is small, they are only installed with some basic circuits, while other electronic modules, such as memory cards, modems, local network cards, etc., are inserted into the electronic devices to implement the corresponding functions. These kinds of electronic cards can also be inserted into a personal computer for data transmission or storage.

Conventionally, the electronic card has only one interface, such as USB interface, or CF (Compact Flash) interface. Thereby, one electronic card can be inserted into only one corresponding slot. If an electronic device has no corresponding slot or the corresponding slot has been occupied, the electronic card cannot be used. Therefore, the application of the electronic card is not flexible. In addition, many electronic cards has only one interface while providing at least two functions, such as ISDN+ Modem PC card, dual serial port PC card, etc. Since such a multi-functional card provides at least two functions, the expansion cabapility is larger. However, this kind of electronic card still has only one interface and thus the application is limited. Therefore, the conventional electronic card is necessary to be improved.

SUMMARY OF THE INVENTION

Accordingly, the object of the present invention is to provide a multi-functional electronic card with multi-I/O interface capable of expanding the applications of electronic cards.

To achieve above object, the multi-functional electronic card with multi-I/O interface in accordance with the present invention includes: a multi-I/O interface having a plurality of interface ports for connecting to a host, wherein, when one interface port is inserted into the host, other interface ports are off-line automatically; at least one functional device, and a multi-interface and multi-functional controller connected to the first functional device and the at least one functional device for selecting one functional device, wherein signals of the multi-I/O interface are converted into signals of the selected functional device so that the host can assess the selected functional device.

The various objects and advantages of the present invention will be more readily understood from the following detailed description when read in conjunction with the appended drawing.

DETAILED DESCRIPTION OF THE PREFERRED EMBODIMENTS

Figure 1:
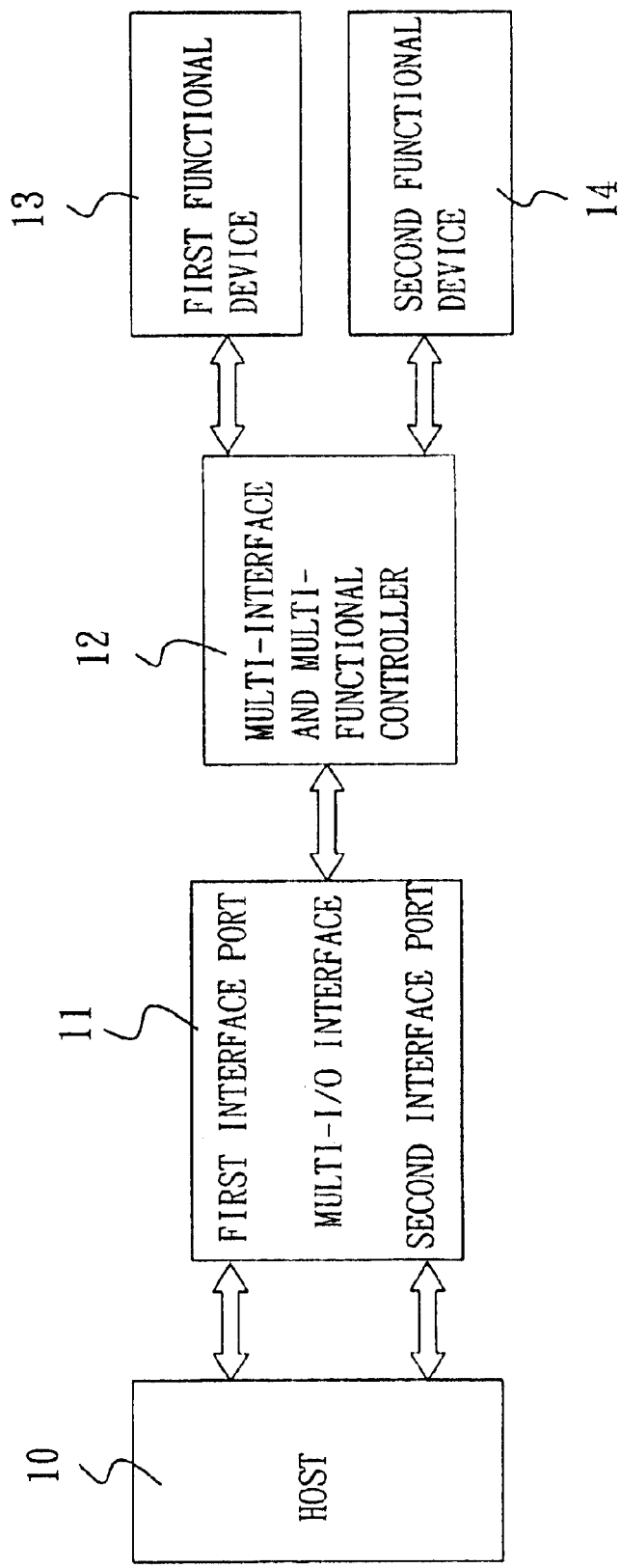
FIG. 1 shows a block diagram of one preferred embodiment of the multi-functional electronic card with multi-I/O interface in accordance with the present invention.

Referring to FIG. 1, one preferred embodiment of the multi-functional electronic card with multi-I/O interface according to the present invention is illustrated. This electronic card has a multi-I/O interface 11, a multi-interface and multi-functional controller 12, a plurality of functional devices. In this embodiment, there are a first functional device 13 and a second functional device 14.

The multi-I/O interface 11 has a plurality of interface ports. When one of the interface ports is inserted into a host 10 (that is, when signals are present on the interface), other interface ports will be off-line automatically, so that the interface is not interfered with. In this embodiment, the multi-I/O interface 11 has a first and a second interface port. Through the multi-I/O interface 11, the signal at a specific interface of the host 10 can be sent to the multi-interface and multi-functional controller 12. The signal is converted by the multi-interface and multi-functional controller 12 into the access signal of the first functional device 13 or second functional device 14. Therefore, the host can access the first functional device 13 or the second functional device 14.

Figure 2:
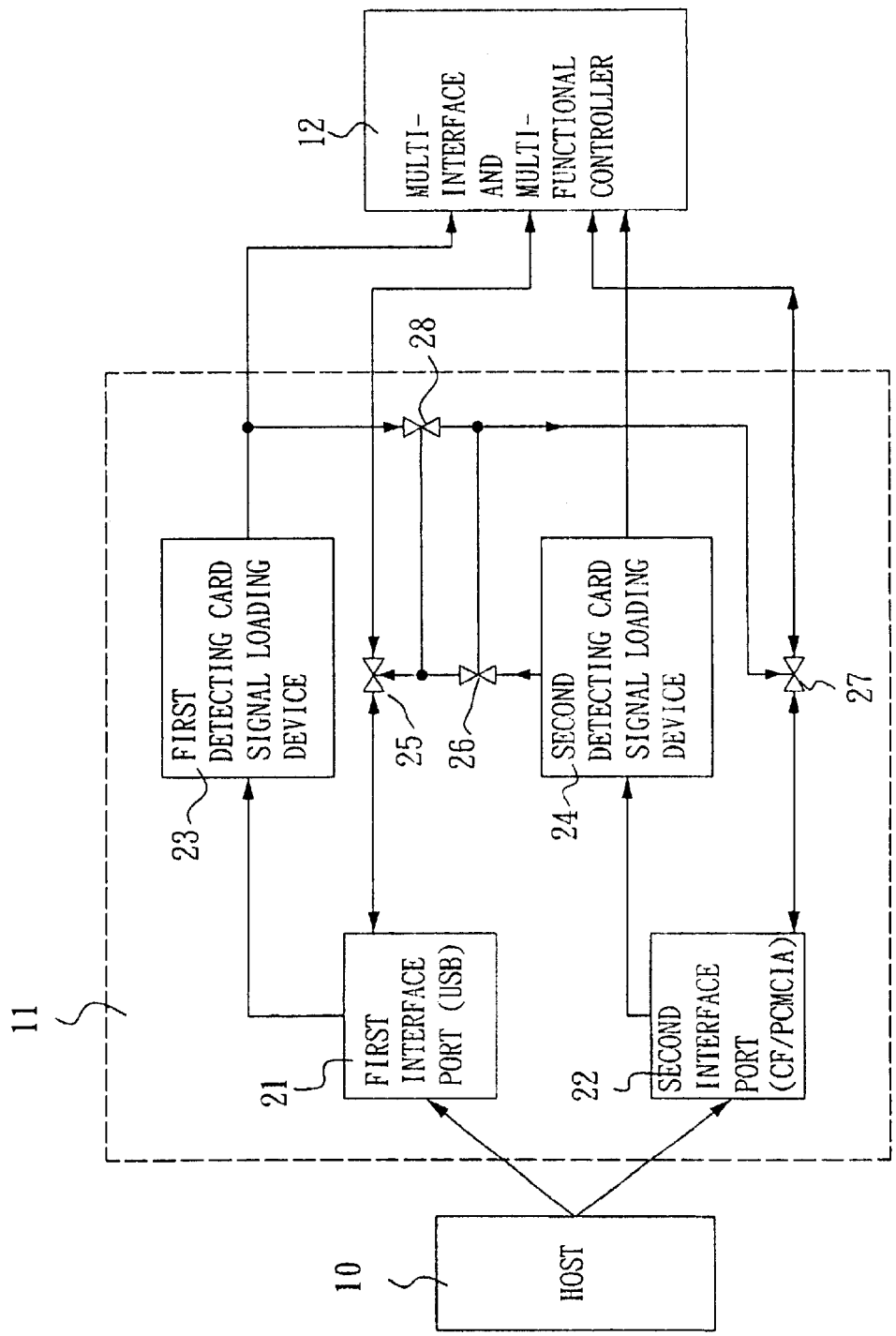
FIG. 2 is a circuit diagram of the multi-I/O interface of FIG. 1.

A circuit diagram of the multi-I/O interface 11 of this embodiment is illustrated in FIG. 2. The multi-I/O interface 11 includes a first interface port 21, a second interface port 22, a first detecting card signal loading device 23, a second detecting card signal loading device 24, a first switch device 25, a second switch device 26, a third switch device 27, and a fourth switch device 28. The first interface port 21 can be an USB interface port. The second interface port 22 can be a CF/PCMCIA interface port.

Figure 3:
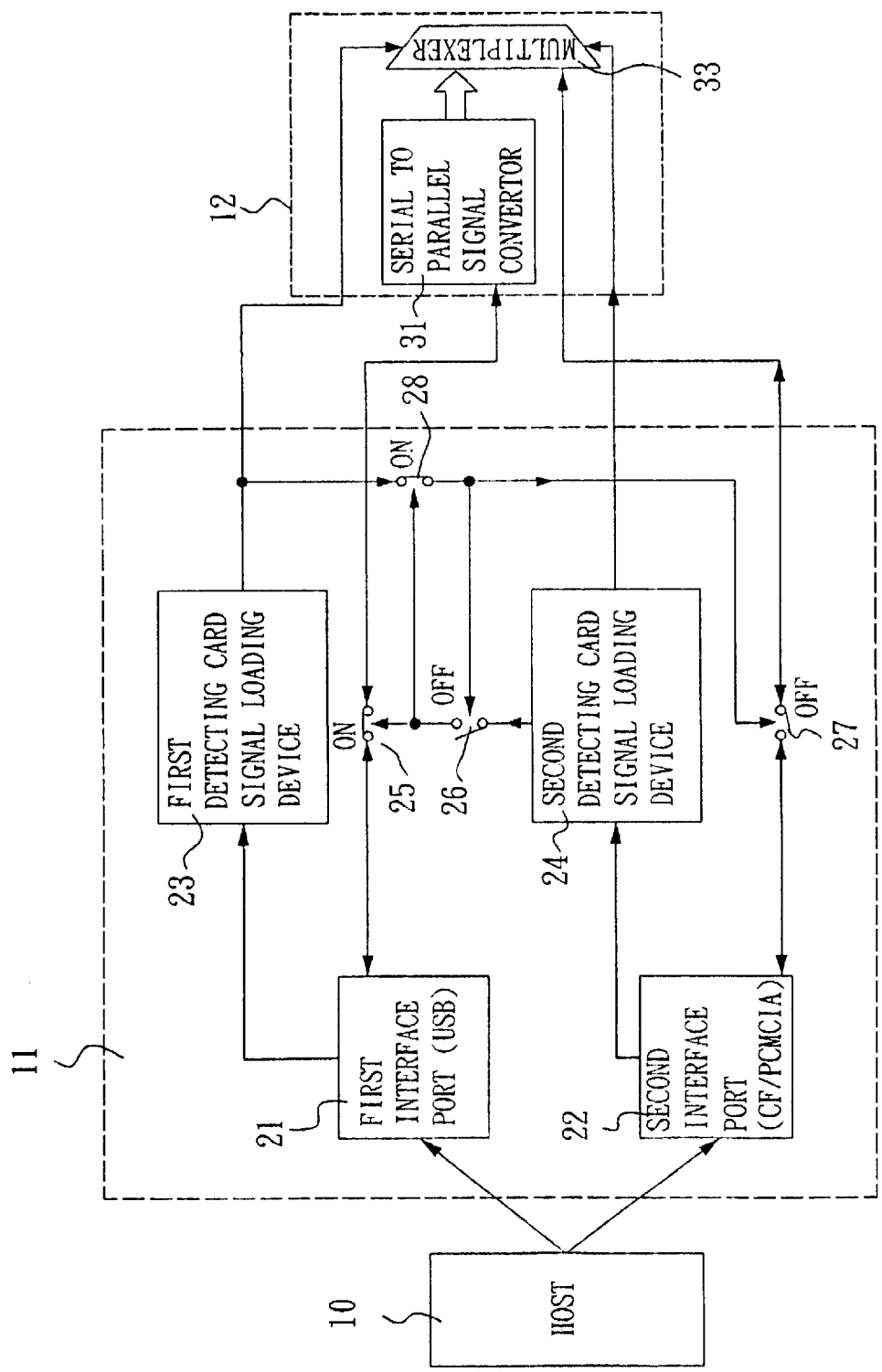
FIG. 3 is a schematic view showing the connection of the signals of the first interface port and the host of FIG. 1.

When the second interface port 21 is connected to the host 10 (for example, a personal computer, a notebook computer, a PDA, etc.), FIG. 3 schematically illustrates the connections of related signals. The first detecting card signal loading device 23 can detect the connection and a second control signal is used to turn off the second switch device 26 and third switch device 27 and turn on the first switch device 25 and fourth switch device 28. Thereby, the second interface port 22 and the multi-interface and multi-functional controller 12 are separated so as to assure that the signal from the second interface port 22 is isolated and thus the signal from the first interface port 21 is not interferred. Moreover, the control signal can be used to control the multiplexer 33 of the multi-I/O interface 11 so that the first interface port 21 is connected to a functional device.

Figure 4:
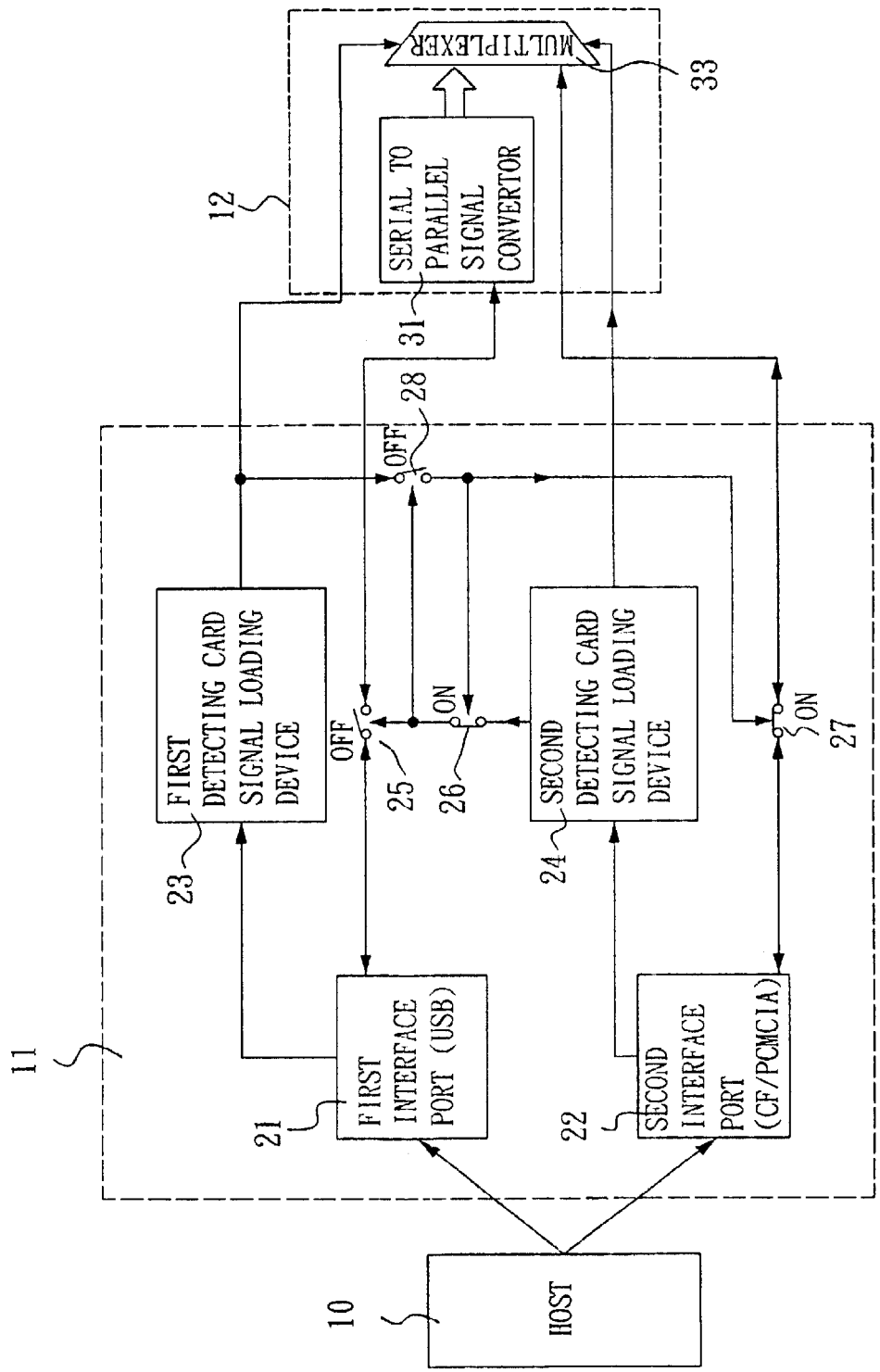
FIG. 4 is a schematic view showing the connection of the signals of the second interface port and the host of FIG. 1.

On the contrary, when the second interface port 22 is connected to the host 10, as illustrated in FIG. 4, the second detecting card signal loading device 24 can detect this connection. Thereby, a control signal is used to isolate the first switch device 25 and the fourth switch device 28 and turn on the second switch device 26 and the third switch device 27. Thereby, the first interface port 21 is separated from the multi-interface and multi-functional controller 12 so as to assure that the signal of the second interface port 21 is isolated and thus the signal of the second interface port is not interferred. Moreover, the control signal can be used to control the multiplexer 33 in the multi-interface and multi-functional controller 12 so that the second interface port is connected to a functional device.

Figure 5:
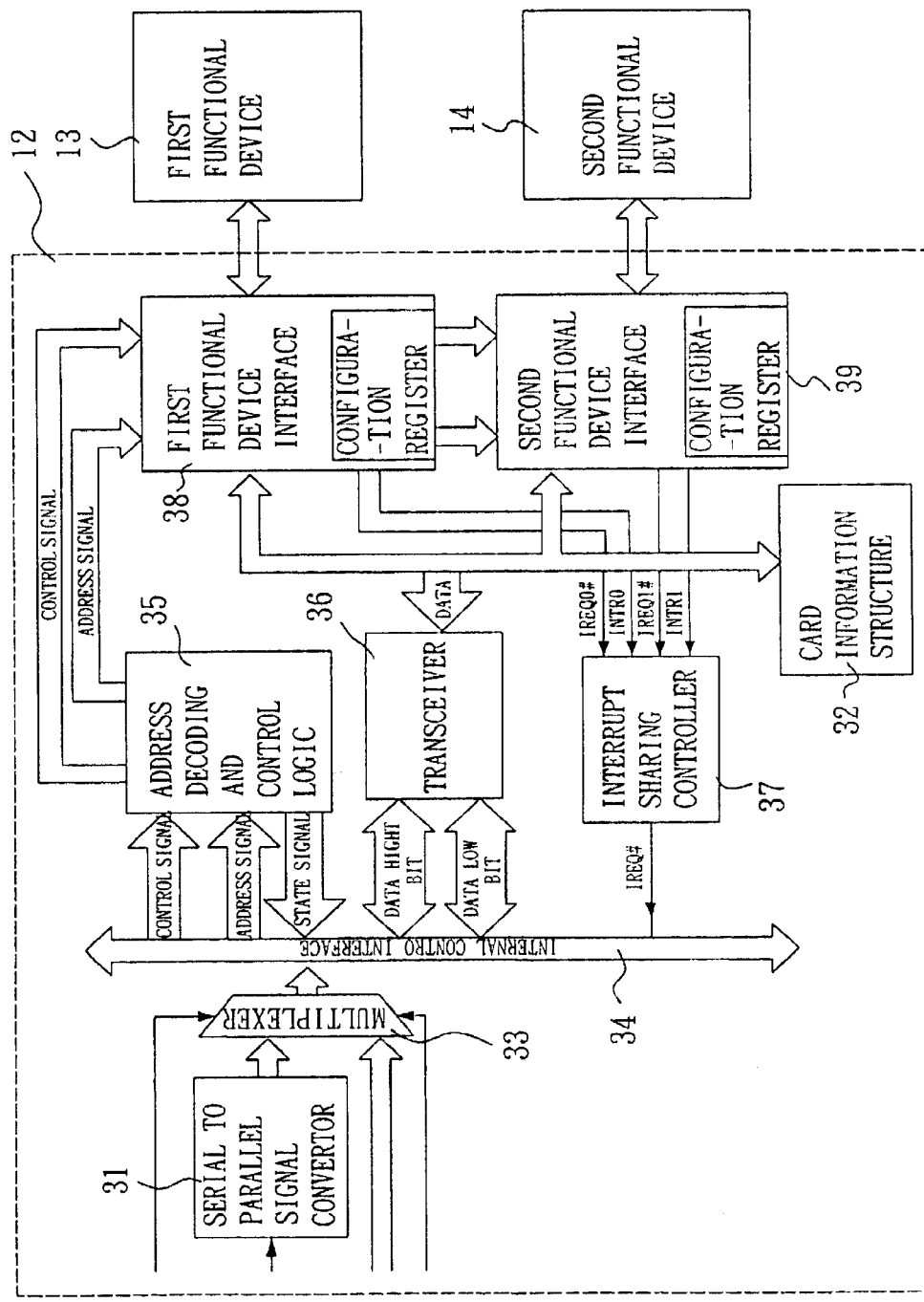
FIG. 5 is a circuit diagram of the multi-interface and multi-functional controller of the FIG. 1.

FIG. 5 shows the circuit diagram of one preferred embodiment of the multi-interface and multi-functional controller 12 according to the present invention. The circuit has a serial to parallel signal convertor 31, a multiplexer 33, an internal control interface 34, an interrupt sharing controller 37, a card information structure 32, a first functional device interface 38, and a second functional device interface 39.

The serial to parallel signal convertor 31 is a serial signal to parallel signal processor. If the first interface port 21 is an USB interface, the serial differential signals (VCC, D+, D-, and GND) can be converted into CF interface parallel signals (Control, Address, and data pin). Then, the multiplexer 33, the first detecting card signal loading device 23 and the second detecting card signal loading device 24 will load control signals of the signal device 24 so that the corresponding signals are sent to the internal control interface 34.

The internal control interface 34 is connected to the multiplexer 33, the address decoding and control logic 35, the transceiver 36 and the interrupt sharing controller 37. The internal control interface 34 sends the received address and control signal to the address decoding and control logic 35. Then, the transceiver 36 receives/transmits the data to the first functional device interface 38 and the second functional device interface 39. The address decoding and control logic 35 receives the address and control signal from the internal control interface 34, and then generates related address and control signals to the related first functional device interface 38 and the second functional device interface 39 for accessing related first functional device 13 and the second functional device 14. The transceiver 36 is positioned among the internal control interface 34, first functional device interface 38 and the second functional device interface 39 for receiving and transmitting data. The transceiver 36 is connected to the first functional device interface 38 and second functional device interface 39 by 16 bit transmision line and is connected to the internal control interface 34 by 8 or 16 bit transmision line. Thereby, the host 10 may access by 8 or 16 bits.

The multi-interface and multi-functional controller 12 is connected to the first functional device 13 and second functional device 14 through the first functional device interface 38 and the second functional device interface 39, respectively. The first functional device interface 38 and the second functional device interface 39 have respective configuration registers corresponding to the card information structure 40 so as to provide configuration data to the first functional device 13 and second functional device 14.

The interrupt sharing controller 37 serves to process the interrupt of the first functional device 13 and the second functional device 14. When the first functional device 13 and the second functional device 14 request a service, an interrupt request is sent to the interrupt sharing controller 37 through the IREQ0#IREQ1# of the first functional device 13 and the second functional device 14, respectively. When the interrupt service is completed, the corresponding INTR0 and INTR1 are cancelled. When the interrupt sharing controller 37 detects that the INTR0 and INTR1 are cancelled, the corresponding IREQ0# and IREQ1# have been serviced at the host 10. Then, an IREQ# is generated automatically to be sent to the host 10 through the internal control interface 34 for being used in the next interrupt. Thereby, a single electronic card can be used to provide several functions.

The first functional device 13 and second functional device 14 can each be an I/O device (for example, GPRS&LAN, GPRS&BlueTooth, GPRS&CPS), or an I/O and memory device (for example, GPRS&SD/MMC, WirelessLAN&SD/MMC).

Figure 6:
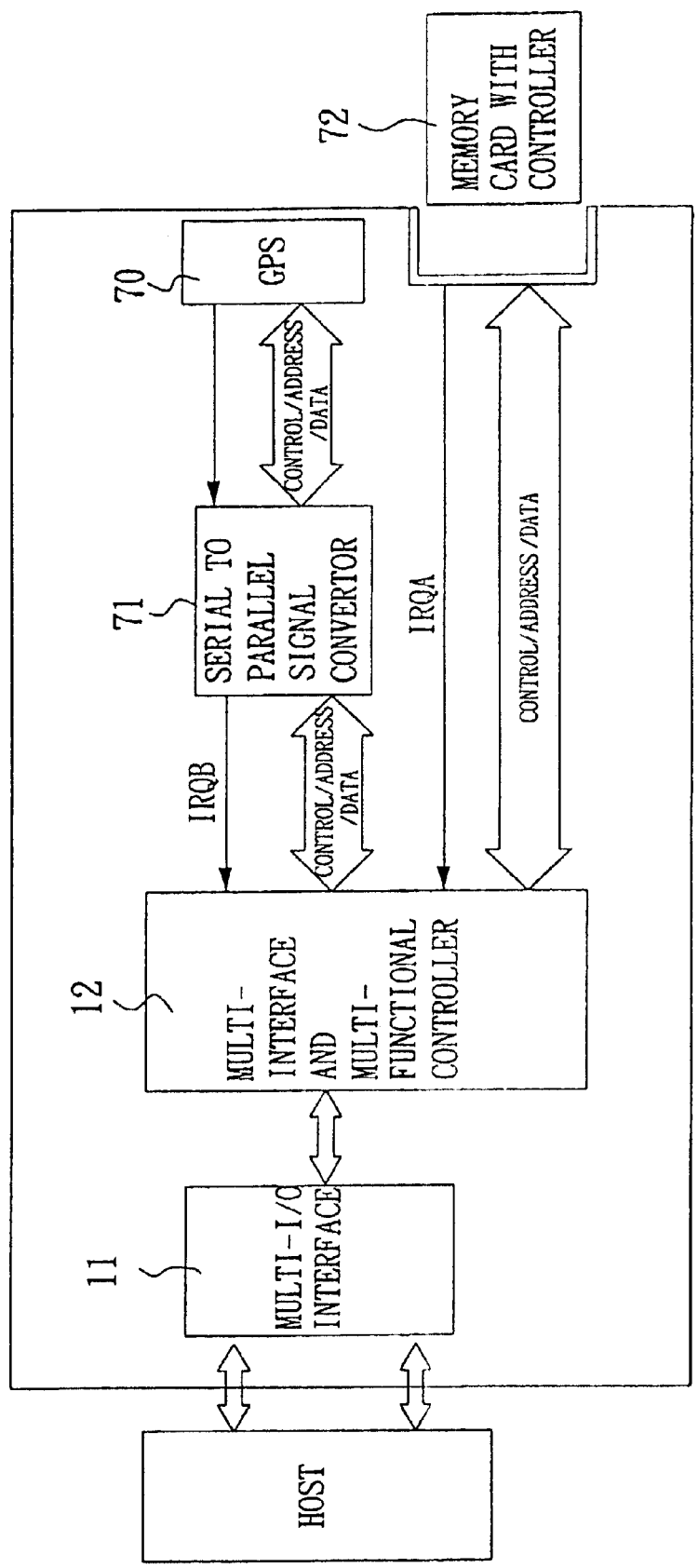
FIG. 6 is a block diagram of one implementation of the multi-functional electronic card with multi-I/O interface in accordance with the present invention.

FIG. 6 is an implementation of the electronic card in accordance with the present invention. The first functional device 13 is a GPS (Global Positioning System 70. Since it has a serial interface, a serial to parallel signal convertor 71 is provided. The second functional device 14 is a memory card 72 for storing necessary electronic maps in memory for plugging in various electronic maps dynamically. The host 10 can read the coordinates of the user from the global positioning system 70 through the multi-I/O interface 11 and the multi-interface and multi-functional controller 12 by the first interface (USB interface) or a second interface (CF/PCMCIA interface). With the electronic map in the memory card, the position of the user can be indicated and positioned precisely. The memory card can be inserted dynamically without affecting the system thereby updating the electronic map and other applications.

Figure 7:
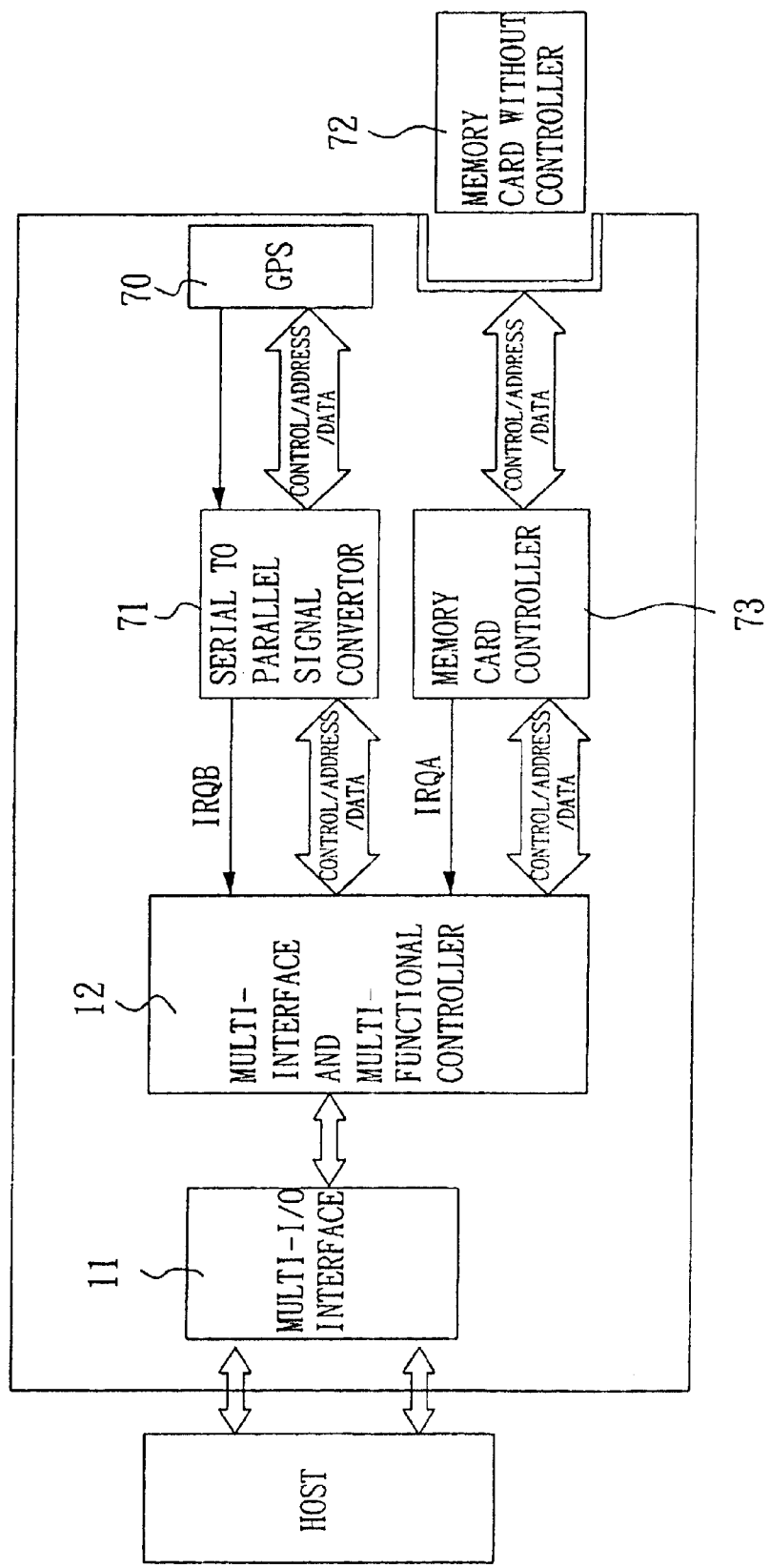
FIG. 7 is a block diagram of another implementation of the multi-functional electronic card with multi-I/O interface in accordance with the present invention.

FIG. 7 shows another implementation of the electronic peripheral card according to the present invention. Comparing with the implementation in FIG. 6, there is an additional memory card controller installed, which can be used with a memory card having no controller. Thereby, the present invention can support more devices.

In view of the foregoing, it is known, with the electronic card of the present invention, the host 10 can be connected to the multi-I/O interface 11 and the multi-interface and multi-functional controller 12 through a first interface (for example, USB interface) or a second interface (for example, CF/PCMCIA interface), so as to access the first functional device 13 and second functional device 14. Moreover, the electronic card of the present invention is featured with a multi-function and multi-I/O interface, so as to improve the convenience and portability of the device.

The present invention are thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A multi-functional electronic card with multiple input/output (I/O) interfaces, comprising:

a multi-I/O interface unit having a plurality of interface ports arranged to be connected to a host, wherein, said multi-I/O interface unit is further arranged to automatically disconnect, and cause to be off-line, all said interface ports except one interface port when said one interface port is inserted into the host;

at least one functional device, and a multi-interface and multi-functional controller connected to the multi-I/O unit and the at least one functional device and arranged to select at least one functional device, wherein signals of the multi-I/O interface are converted into signals of the selected at least one functional device so that the host can access the selected at least one functional device, wherein the multi-I/O interface includes at least a first interface port and a second interface port, a first detecting card signal loading device and a second detecting card signal loading device corresponding to the first interface part and second interface port, respectively, and a switch means, wherein the first and second detecting card signal loading device is arranged to detect whether a corresponding interface port is inserted to the host and, if the corresponding interface port is inserted into the host, to control the switch means to disconnect the other interface ports so that the other interface ports are off-line, and wherein the switch means includes first, second, third and fourth switch devices: the first interface port is connected to the first detecting card signal loading device and the first switch device; the first detecting card signal loading device is connected to the fourth switch device; the second interface port is connected to the second switch device and the third switch device; and the second detecting card signal loading device is connected to the second switch device.

2. A multi-functional electronic card with multiple input/output (I/O) interfaces as claimed in claim 1, wherein the first detecting card signal loading device is arranged to turn off the second switch device and the third switch device and turn on the first switch device and the fourth switch device when the first interface port is connected to the host so that the second interface port is separated from the multi-interface and multi-functional controller.

3. A multi-functional electronic card with multiple input/output (I/O) interfaces as claimed in claim 1, wherein the second detecting card signal loading device is arranged to turn off the first switch device and the fourth switch device and turn on the second switch device and the third switch device when the second interface port is connected to the host so that the first interface port is separated from the multi-interface and multi-functional controller.

4. A multi-functional electronic card with multiple input/output (I/O) interfaces as claimed in claim 1, wherein the multi-interface and multi-functional controller comprises:
   a multiplexer controlled by the first and second detecting card signal loading devices for selecting an active interface port to re-send corresponding signals; and
   an interrupt sharing controller for processing the interrupts generated by the functional devices so that the host services the functional devices sequentially.

5. A multi-functional electronic card with multiple input/output (I/O) interfaces as claimed in claim 1, wherein the multi-interface and multi-functional controller comprises:
   a multiplexer controlled by the first and second detecting card signal loading devices for selecting an active interface port to re-send corresponding signals;
   an interrupt sharing controller for processing the interrupts generated by the functional devices so that the host services the functional devices sequentially; and
   a memory card controller for processing related signals from a memory card device having no controller.

* * * * *